(No Model.)

G. W. ZASTROW.
BEARING FOR PROPELLER SHAFTS.

No. 260,345. Patented June 27, 1882.

WITNESSES:
Fred G. Dieterich
A. G. Syne

INVENTOR:
G. W. Zastrow
BY
ATTORNEYS.

UNITED STATES PATENT OFFICE.

GEORGE W. ZASTROW, OF BALTIMORE, MARYLAND.

BEARING FOR PROPELLER-SHAFTS.

SPECIFICATION forming part of Letters Patent No. 260,345, dated June 27, 1882.

Application filed March 25, 1882. (No model.)

*To all whom it may concern:*

Be it known that I, GEORGE W. ZASTROW, of Baltimore, in the State of Maryland, have invented a new and useful Improvement in Stern Bearings for Screw-Propellers, of which the following is a full, clear, and exact description, reference being had to the annexed drawings, forming part of this specification.

This invention relates to stern bearings for screw-propellers in vessels for navigation; and the invention consists of a bearing which is so constructed that it may be adjusted to take up wear without removing the screw-propeller from its shaft or otherwise disarranging any of the parts of the propelling apparatus.

Figure 1:
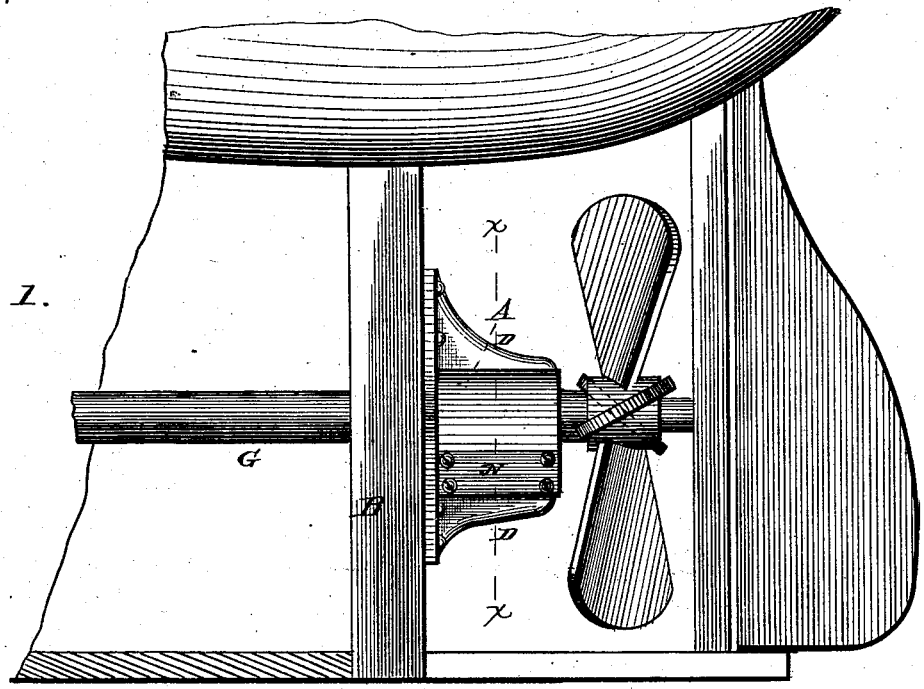
Figure 2:
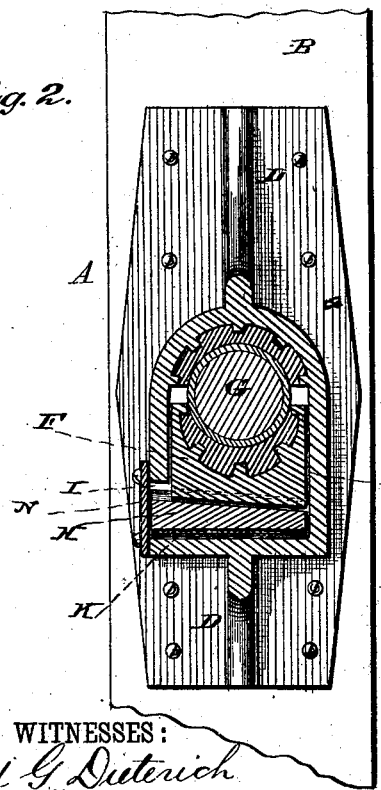
Figure 3:
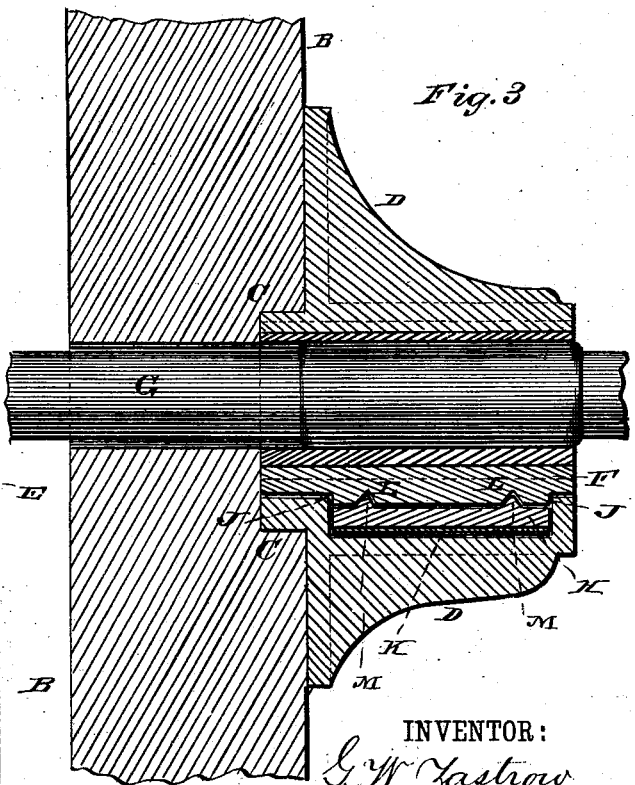

In the accompanying drawings, Figure 1 is a sectional side elevation of a portion of a boat embodying my invention. Fig. 2 is a section of the bearing, taken on line $x\,x$, Fig. 1;
and Fig. 3 is a vertical longitudinal section taken through the center of the bearing.

The bearing A, which is secured to the stern-post B, is constructed with an off-set, C, at its center, which fits into a corresponding recess in the post, to provide a strong connection between the parts. The outer end of the bearing is further strengthened by ribs D, extending from said end, at the top and bottom thereof, to the plate by which the bearing is secured to the post. The bearing is constructed with a rectangular chamber, E, having its upper wall arched and lined with lignum-vitæ or other suitable material, and a corresponding bearing-block, F, of partially-rectangular form, and having its base made broader than the diameter of the shaft G, is inserted into the said chamber and supported in contact with the shaft G by means of a wedge-plate, H, which is inserted under the said block through a side opening, I, in the bearing.

As the chamber E extends into the recess in the post the ends of the block extend beyond the sides of the wedge-plate, and are provided with off-sets J, which are adapted to rest upon the bearing at the sides of the plate. That portion of the block, however, which rests in contact with the wedge-plate H is made inclined from a horizontal plane to correspond with the form of the wedge-plate, so that when the block is raised by means of plates K, which are to be inserted under the plate H to take up wear between the shaft and its bearing, the block will be supported in a horizontal position by the bottom of the wedge-plate resting upon the plates K in the bottom of the chamber E. As a means of keying the block F in the chamber E, the inclined bottom of the block is provided with transverse V-grooves L, into which fit corresponding ribs, M, on the wedge-plate H. The side opening, I, in the bearing is to be closed, to prevent the wedge-plate from working out, by means of a suitable plate, N, which is secured to the bearing in any convenient manner. With this construction, when it is desired to adjust the bearing-block to take up wear it is only necessary to select a plate, K, of the required thickness, remove the plate N and the wedge-plate H, place the plates H and K together, and force them into position under the block. By increasing the thickness of the lignum-vitæ lining of the bearing-block the latter may successfully be used for years by simply inserting additional plates under the block.

I am aware that it is not broadly new to wedge up a bearing-plate in a screw-propeller when it is necessary to take up wear between the parts. My invention, however, is distinguished from all others hitherto in use in that the bearing plate or block is provided with a broad rectangular or nearly-rectangular base to prevent it from wearing and turning in its seat, and the lifting-plate is adapted to serve as a broad support for the latter to prevent any cutting action between the parts, and is inserted transversely thereunder through an opening in the side of the housing, whereby it may conveniently be reached and additional plates be inserted to adjust the same without removing the wheel.

Having thus described my invention, what I claim as new, and desire to secure by Letters Patent, is—

1. In a bearing for screw-propellers, the combination, with a housing, of a bearing-block having transverse grooves in its bottom, and a plate having ribs to fit into the grooves, whereby the block shall be adjusted and held in its chambers, as shown and described.

2. In a bearing for screw-propellers, the combination, with the stern-post, of the housing provided with an opening at one side, the bearing-block having its base made broader than the diameter of the shaft, and provided with transverse grooves in its under surface, the plate having ribs to fit in the grooves of the bearing-block, and means for closing the opening in the side of the housing, substantially as shown and described, and for the purpose set forth.

GEO. W. ZASTROW.

Witnesses:
A. G. LYNE,
SOLON C. KEMON.